(12) United States Patent
Morley et al.

(10) Patent No.: US 9,747,030 B2
(45) Date of Patent: Aug. 29, 2017

(54) MANAGING MEDIA CONTENT STORAGE FOR USER DEVICES

(71) Applicant: Verizon Patent and Licensing Inc., Arlington, VA (US)

(72) Inventors: Dorothy Beau Morley, Wayland, MA (US); Hannah Moon, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 14/799,261

(22) Filed: Jul. 14, 2015

(65) Prior Publication Data

US 2017/0017397 A1    Jan. 19, 2017

(51) Int. Cl.
| | |
|---|---|
| G06F 12/00 | (2006.01) |
| G06F 13/00 | (2006.01) |
| G06F 13/28 | (2006.01) |
| G06F 3/06  | (2006.01) |

(52) U.S. Cl.
CPC ............ G06F 3/0604 (2013.01); G06F 3/067 (2013.01); G06F 3/0652 (2013.01)

(58) Field of Classification Search
CPC .... G06F 3/0608; G06F 3/0647; G06F 3/0649; G06F 3/067
USPC ........................................................ 711/154
See application file for complete search history.

(56) References Cited

U.S. PATENT DOCUMENTS

| | | | | |
|---|---|---|---|---|
| 8,032,719 | B2 * | 10/2011 | Bowers ................ | H04N 19/172 711/154 |
| 8,156,435 | B2 * | 4/2012 | Wohlert ............ | G06F 17/30029 345/440 |
| 8,964,054 | B2 * | 2/2015 | Jung ...................... | H04N 5/232 348/211.11 |
| 9,361,349 | B1 * | 6/2016 | Newhouse ........ | G06F 17/30575 |
| 2005/0193414 | A1 * | 9/2005 | Horvitz ................ | H04N 21/482 725/46 |
| 2013/0005471 | A1 * | 1/2013 | Chung .................... | A63F 13/12 463/42 |
| 2014/0095964 | A1 * | 4/2014 | Mayblum ........... | G06F 17/3089 715/201 |

(Continued)

OTHER PUBLICATIONS

"Google I/O 2015—Keynote." YouTube video, 2:08:27, 59:46-72:49. Posted by "Google Developers," May 28, 2015. https://www.youtube.com/watch?v=7V-flGMDsmE. Screen Shot and Transcript attached.

*Primary Examiner* — Sheng-Jen Tsai (57) ABSTRACT

A user device (e.g., a smart phone) may dynamically manage photographs, videos, and other types of media content. The user device may receive media content by taking photographs, recording videos, and/or recording audio inputs. The user device may also receive media content in email messages, text message, download, etc. The user device may determine the value of the media content based on factors, such as the quality of the media content, the time and location associated with the media content, the actual content (e.g., people, landscapes, etc.) of the media content, etc. The user device may also determine a storage strategy based on the value of the media content and proceed to execute the storage strategy. For instance, the user device may store the media content locally, upload the media content to a cloud storage system, or delete the media content from a local storage of the user device.

20 Claims, 8 Drawing Sheets

(56) References Cited

U.S. PATENT DOCUMENTS

| | | | | |
|---|---|---|---|---|
| 2014/0096032 A1* | 4/2014 | Mayblum | ............... | H04L 51/22 715/752 |
| 2015/0186478 A1* | 7/2015 | Yan | ................... | G06F 17/30997 707/722 |
| 2015/0373116 A1* | 12/2015 | Mo | ....................... | G06F 3/0608 709/219 |
| 2015/0381834 A1* | 12/2015 | Mizuno | .............. | H04N 1/00517 715/745 |

* cited by examiner

MANAGING MEDIA CONTENT STORAGE FOR USER DEVICES

BACKGROUND

Smart phones and other types of user devices are often capable of storing different types of media content, such as pictures, videos, music, etc. In some implementations, smart phones may store the media content locally (e.g., in a local memory) or remotely (e.g., using an external device such as a network server).

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to dynamically manage photographs, videos, and other types of media content received by a user device (e.g., a smart phone). The user device may receive media content by taking photographs, recording videos, and/or recording audio inputs. The user device may also receive media content in email messages, text messages (e.g., Short Message Service ("SMS") messages, Multimedia Messaging Service ("MMS") messages, or the like), downloads, and other forms of communications. In accordance with some implementations, the value of the media content may be determined based on one or more factors. Examples of such factors, described in greater detail herein, may include the quality of the media content, the uniqueness of the media content, the time and location of the media content, features (e.g., graphical features, such as people, landscapes, buildings, etc. in the case of graphical content; audio features, such as tones, audio patterns, etc. in the case of audio content) of the media content, user management patterns corresponding to similar types of media content, and more. In some implementations, the value of media content may be viewed in terms of the preference a user would have in storing the media content locally versus storing the media content in an external device and/or deleting the local copy of the media content.

The user device may also determine a storage strategy based on the value of the media content and proceed to execute the storage strategy. For instance, the storage strategy may entail storing the media content locally at the user device, uploading the media content to a cloud storage system, uploading the media content to a social networking service, and/or deleting the media content from a local storage of the user device. As such, techniques described herein may be used to intelligently implement storage strategies for media content created or received by a user device so that, for example, the local storage capacity of the user device is not wasted on media content that should be deleted and/or stored elsewhere.

Figure 1:
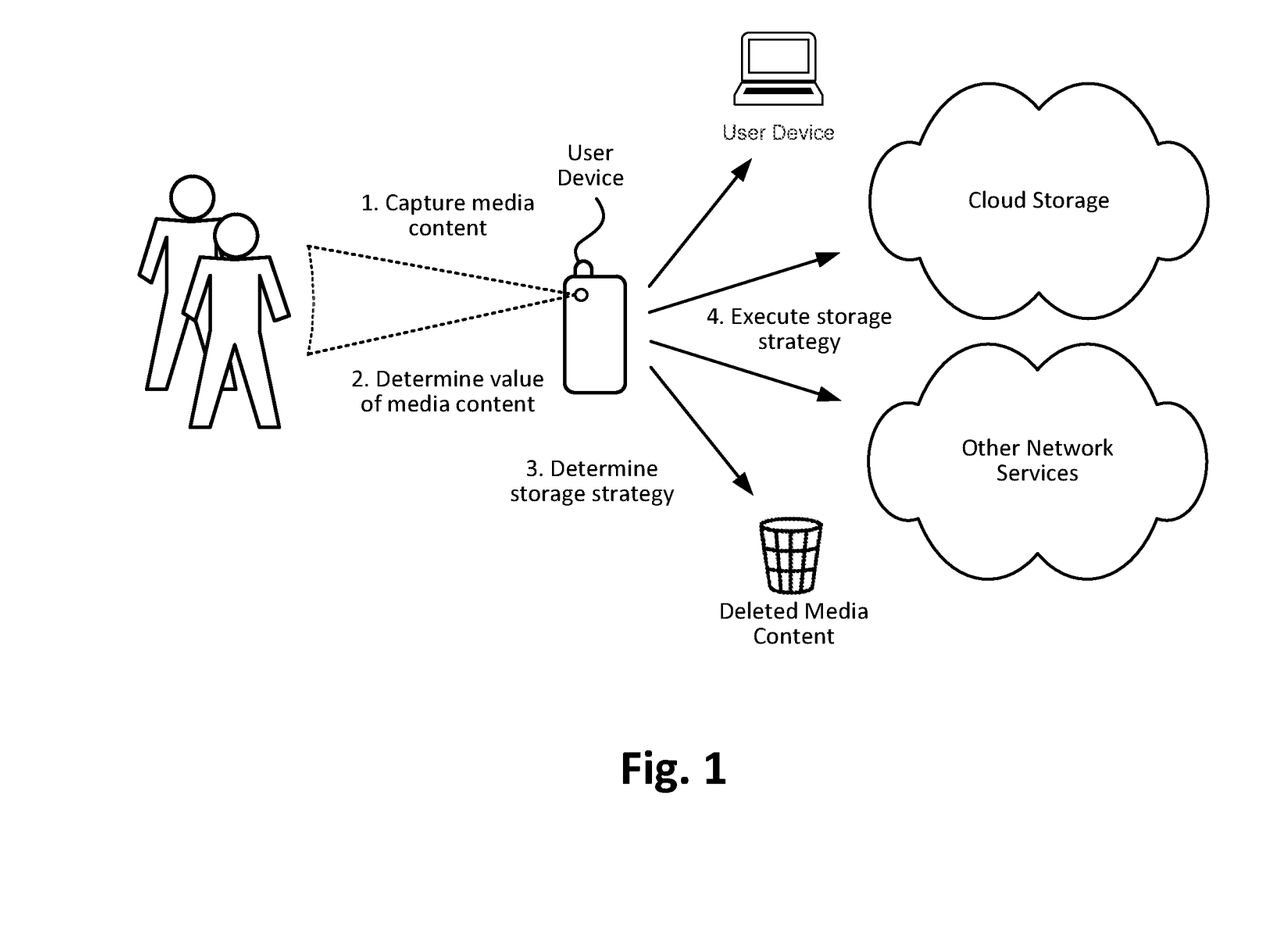
FIG. 1 illustrates an example overview of an implementation described herein.

FIG. 1 illustrates an example overview of an implementation described herein. As shown in FIG. 1, a user device may capture media content by, for example, taking pictures and recording videos (at 1). The user device may determine the value of the media content based on one or more of the factors. The value of the media content may represent a predicted preference, on the part of the user, for storing the media content on the user device as opposed to offloading the media content to an exterior device and/or deleting the media content.

As briefly mentioned above, such factors may include the quality of the media content itself, the uniqueness of the media content, the time and location corresponding to the media content, features of the media content (e.g., graphical features, audio features, etc.), user management patterns corresponding to similar types of media content, whether the media content has been, or will be, stored on an external device (e.g., a cloud computing system or another user device such as a laptop or desktop computer), and/or user behavior with regard to the media content (e.g., whether the user has uploaded the media content to a social networking service, sent the media content to another user via email or text message, etc.).

The user device may determine a storage strategy for the media content based on the determined value the media content. In some implementations, the storage strategy may include storing the media content on the user device. In some implementations, the storage strategy may also, or alternatively, include storing the media content on another user device, such as a personal computer, storing the media content on a networking device (that may be part of a cloud storage service) and/or deleting the media content from the user device. In some implementations, the storage strategy may also include prompting the user to provide input, such as a confirmation, permission, etc., prior to executing the storage strategy. As such, the user device may intelligently conserve local storage resources by implementing storage strategies that account for considerations such as the determined value of the media content, the availability of storage alternatives (e.g., a cloud storage service), and user preferences, permissions, and behavioral patterns.

Figure 2:
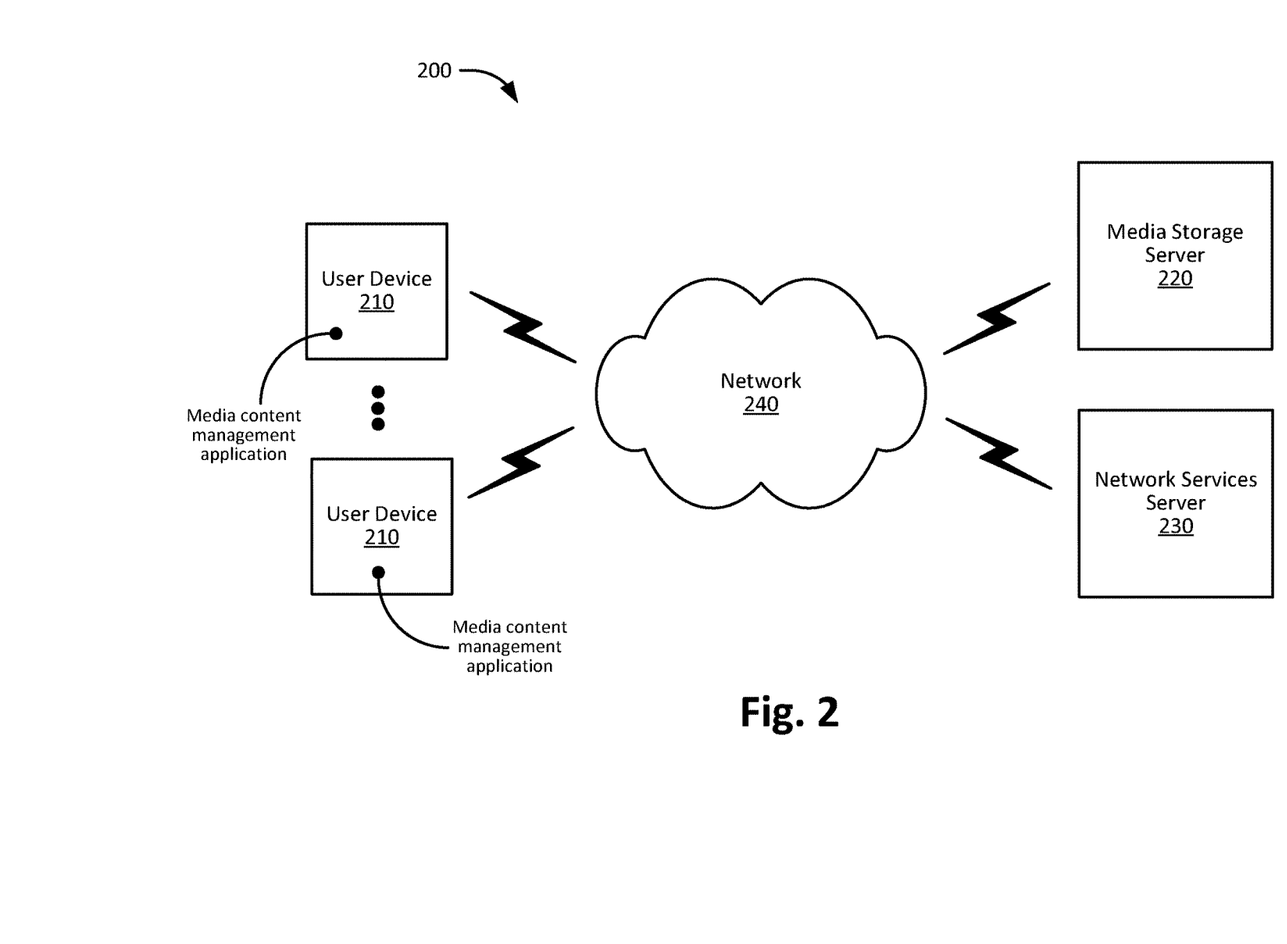
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, media storage server 220, network services server 230, and network 240. As shown, media storage server 220 and network services server 230 may be implemented by different server devices; however, in other implementations, media storage server 220 and network services server 230 may be implemented by the same device.

User device 210 may include a portable computing and communication device, such as a personal digital assistant (PDA), a smart phone, a cellular phone, a laptop computer with connectivity to a cellular wireless network, a tablet computer, etc. UE 210 may also include non-portable computing devices, such as a desktop computer, a consumer or business appliance, or other devices that have the ability to connect to network 240. UE 210 may also include a computing and communication device that may be worn by a user (also referred to as wearable devices) as a watch, a fitness band, a neckless, glasses, an eyeglass, a ring, a belt, a headset, or another type of wearable device.

As depicted, user device 210 may include software, such as a media content management application, that may enable user device 210 to perform one or more of the operations described herein, such as accessing media content received by user device 210, determining the value of media content, determining an appropriate storage strategy for the media content, and executing the storage strategy. The software may be installed by the user, by a manufacturer of the device, by a telecommunications service provider, and/or by a vendor. In some implementations, the software may be part of an operating system (OS) level functionality and/or may be part of a firmware or read-only-memory (ROM).

Media storage server 220 may include one or more computing devices, such as a server device or a collection of server devices, capable of receiving and storing media content (e.g., images, videos, audio recordings, etc.) from user device 210. Media storage server 220 may also be capable of providing user device 210 with access to the media content that is being stored on behalf of user device 210. In some implementations, media storage server 220 may perform one or more networking services in addition to storing media content for user device 210. For instance, media storage server 220 may also be capable of managing storage service accounts for users, maintaining user profiles, implementing policies and user preferences regarding content storage, security, and access, etc.

Network services server 230 may include one or more computing devices, such as a server device or a collection of server devices, capable of providing one or more networking services to user device 210. For instance, network services server 230 may provide social networking services that may be used by a user to upload and share media content with other users. Network services server 230 may also include, or be in communication with, an email server, an SMS server, and/or another type of network device that enables users to share media content with one another. Network services server 230 may include a short message service center (SMSC), a multimedia message service center (MMSC), and/or some other device associated with a wireless telecommunication service provider's network. In some implementations, network services server 230 may include an over the time (OTT) device that is accessible via a public network such as the Internet.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
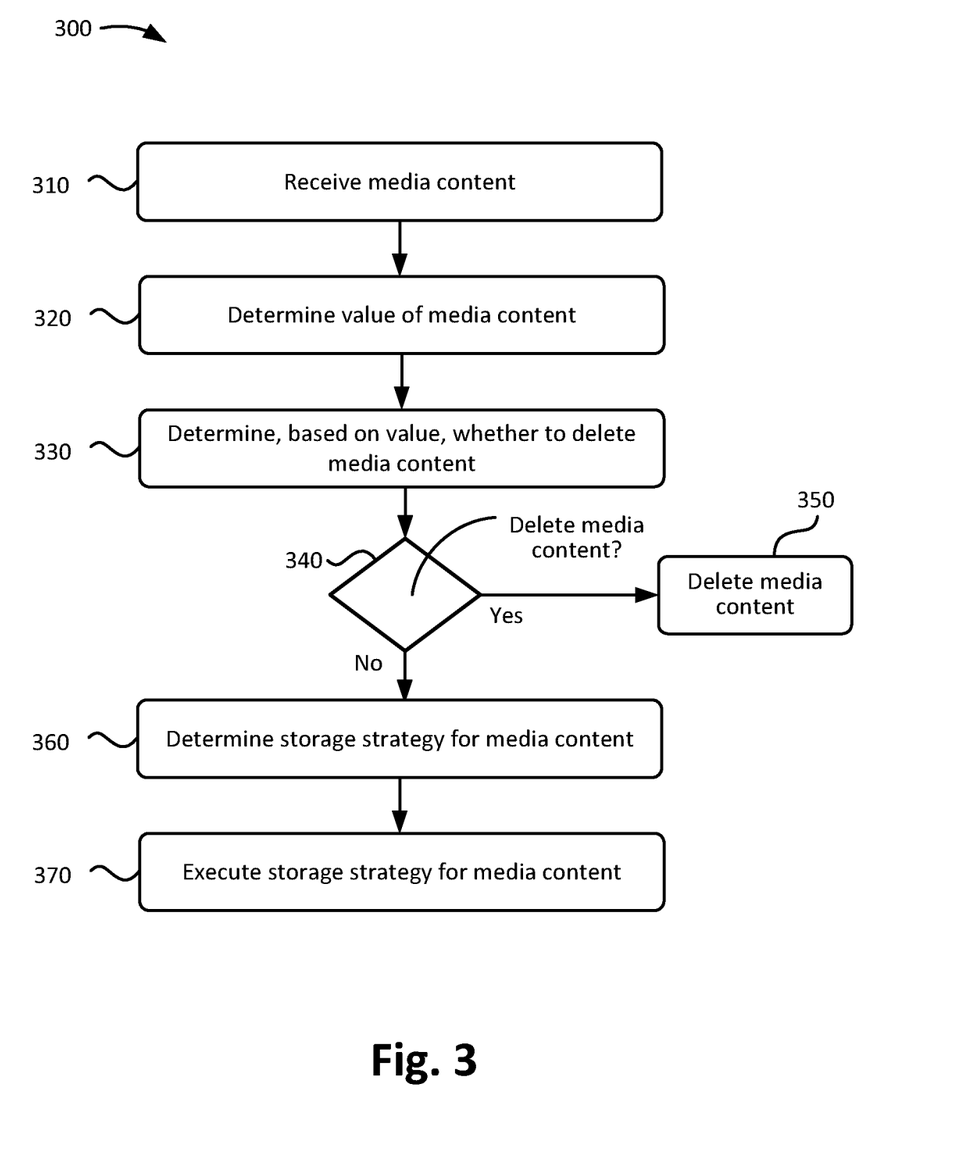
FIG. 3 is a flowchart diagram of an example process for implementing an appropriate storage strategy for media content.

FIG. 3 is a flowchart diagram of an example process 300 for implementing an appropriate storage strategy for media content. Process 300 may be implemented by user device 210 (e.g., by a media content management application).

As shown, process 300 may include receiving media content (block 310). For example, user device 210 may capture media content by taking pictures, recording videos, recording audio inputs, etc. User device 210 may also receive media content via email, text message, download, web browsing, and/or another type of file transfer/download. Initially, user device 210 may temporarily store the media content locally. However, as described below, user device 210 may proceed to analyze the media content and determine an appropriate storage strategy for the media content.

Process 300 may include determining the value of the media content (block 320). For instance, user device 210 may analyze media content to determine whether the media content is important enough to be stored locally or remotely. User device 210 may determine the value of media content based on an analysis of one or more factors, such as the quality of the media content, features of the media content, the uniqueness of the media content, the time and location associated with the media content, and more. A detailed example of determining the value of media content is discussed below with reference to FIG. 4.

Process 300 may include determining, based on the determined value, whether to delete the media content (block 330). For example, user device 210 may determine whether to delete media content based on one or more factors. Examples of such factors may include the value assigned to the media content in question, the value assigned to other media content that are currently being stored by user device 210, how much storage capacity is available, and more. User device 210 may also implement one or more rules and/or thresholds for determining whether to delete media content. In some implementations, the thresholds may include certain limitations or conditions in order to provide a storage management policy that can adjust based on constraints such as the availability of storage capacity, the relative values of different media content, etc. A detailed example of determining whether to delete media content is discussed below with reference to FIG. 5.

If the media content is to be deleted (340—Yes), process 300 may include deleting the media content (block 350). For example, user device 210 may delete the media content when the value of the media content fails to exceed a value threshold for storing media content. In some implementations, a prompt may be provided to the user in order to obtain permission to delete the media content. Additionally, or alternatively, user device may provide the user with a notification that the media content has been (or will be) deleted. If the media content is not to be deleted (block 340—No), process 300 may include determining a storage strategy for the media content. For example, user device may determine a storage strategy for the media content when the media content is assigned a value that exceeds a threshold for deleting media content.

Process 300 may include determining a storage strategy for media content (block 360). For example, user device 210 may determine a storage strategy that is suitable for media content. The storage strategy may include one or more operations, such as determining whether to store the media content locally or to store the media content on an external device, such as media storage server 220. In some implementations, the storage strategy may include storing the media content on media storage server 220 and deleting the media content from user device 210. Doing so may increase the storage capacity available on user device 210 while ensuring that the user retains access to the media content. In some implementations, the storage strategy may include storing the media content locally on user device 210 and remotely on media storage server 220. A detailed example of determining a storage strategy is discussed below with reference to FIG. 7.

Process 300 may include executing the storage strategy for the media content (block 370). For example, user device 210 may execute the storage strategy by causing the media content to be stored by user device 210 or an external device such as another user device 210 or media storage server 220). In some implementations, executing the storage strategy may include providing the user with notifications regarding where the media content will be stored and/or a confirmation that the storage strategy has been successfully executed (e.g., that the media content was offloaded to media storage server 220 and deleted from user device 210).

As mentioned above, FIG. 4 is a logical flow diagram of an example implementation for determining the value of media content. The information and operations represented by the logical flow diagram of FIG. 4 may be implemented by user device 210 (e.g., by a media content management application).

Figure 4:
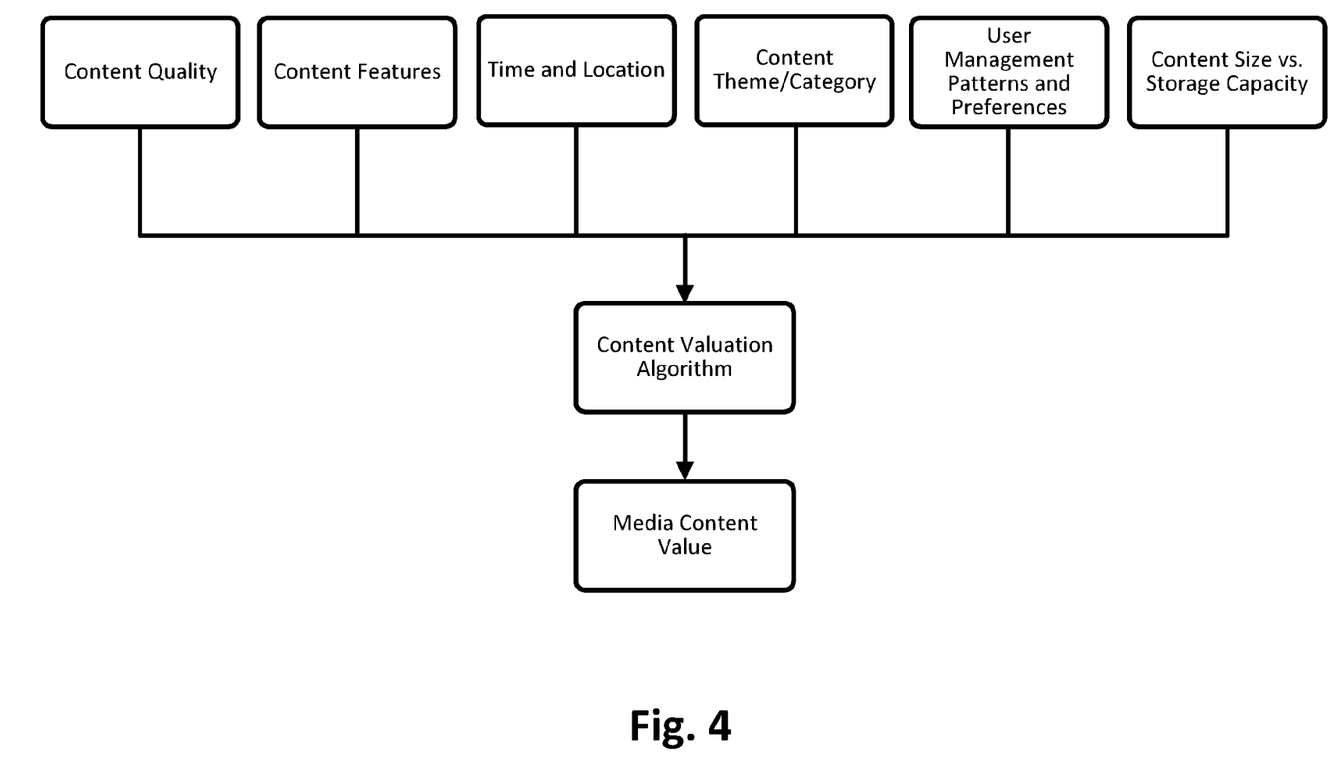
FIG. 4 is a logical flow diagram of an example implementation for determining the value of media content.

As shown, user device 210 may use several types of information to determine the value of media content. Examples of such information may include quality, content features, time and location information, one or more themes or categories, user management patterns and/or preferences, and content size relative to storage capacity. In some implementations, additional information, alternative information, or less information may be used by user device 210 to determine the value of media content.

Content quality may include the general quality and condition of the media content. For instance, when the media content includes a picture, content quality may be based on whether the photograph is too bright or too dark (e.g., whether the picture was taken in an environment with too much or too little lighting), whether the picture is blurry in one or more areas, and/or whether the photograph is centered or otherwise oriented in an aesthetically pleasing manner. Additional examples may include whether individuals in the photograph appear with so-called "red eyes," whether individuals that appear to be the primary focus of the photograph are facing the camera with their eyes open, whether significant or prominent portions of the photograph are in focus, etc. In some implementations, resolution and/or image size may also be an indication of content quality. In some implementations, content quality may include an amount of white-noise or other types of interference or imperfections corresponding to an audio signal.

Content features may describe attributes of the content itself. For example, if the content is an image that includes a picture of a people, user device 210 may analyze the photograph to determine that the features of the image include a group of individuals that appear to be the primary focus of the photograph (because they are all, for example, facing the camera and smiling). User device 210 may also use facial recognition technology in an attempt to identify each of the individuals in the photograph.

For instance, user device 210 may compare the faces in the photograph with user profile pictures in an address book of user device 210 in order to identify, by name, as many of the individuals in the picture as possible. User device 210 may also, or alternatively, access user profile information that may be available via a social network (or other service) in order to specifically identify (e.g., by name, by frequency of correspondence, by nature of correspondence, etc.) each individual in the picture, which may lead to user device 210 being able to determine whether the individuals in the picture are friends or relatives of the user. Doing so may enable user device 210 to more accurately determine the value of the photograph since the user may be more likely to want to store a photograph of friends and family than a photograph of strangers.

In another example, user device 210 may implement one or more content analysis tools (e.g., facial recognition technologies, pattern recognition technologies, etc.) to identify the features of a picture, a video, an item of audio content, etc. For instance, assume that user device 210 is attempting to discover the features contained a picture of people playing soccer on an outdoor field. User device 210 may implement facial recognition to identify one or more faces in the picture. Understanding that the picture includes at least some people, user device 210 may use pattern recognition technologies to determine what the people in the picture are doing. As a result, user device 210 may be able identify several bodies within the picture that are positioned in a manner that is consistent with running or jogging. The pattern recognition technology may also reveal that most of the clothes worn by the people in the picture have one of two color schemes and one of two design patterns, which is consistent with two teams wearing jerseys. Having discovered that the picture includes people that are running and that are wearing one of two types of jerseys, user device 210 may determine that the picture is likely of some type of organized athletic competition.

Further analysis may identify a sphere in the picture that has a shape, size (relative to nearby people), pattern, color scheme, and location (on the ground) that is consistent with a soccer ball. Based on these determinations, user device 210 may reasonably conclude that the picture is of a soccer game. And with additional analysis, user device 210 may recognize a one side of the picture is predominantly blue with a significant light source, while the opposing side of the picture is predominately green. As such, user device 210 may reasonably conclude that the soccer game is taking place outside because the blue in the picture is probably the sky, the significant light source is probably the sun, and the green in the picture is probably the grass.

In some implementations, content features for an audio signal may include a beat (e.g., a drum beat), a tempo, a type of instrument (e.g., a guitar, a violin, etc.), vocals, tones, pitches, etc. In some implementations, content features may include noises consistent with a voice recording, a birthday party, or a preferred type of music of the user (e.g., rock and roll, hip hop, etc.). In some implementations, content features may include bad content or unidentifiable audio signals, which may occur when, for example, the user accidentally hits record on a voice memo application.

Enabling user device 210 to not only ascertain the general quality of media content, but also to determine the actual content (e.g., the features) within the media content may enable user device 210 to make intelligent decisions about allocating local and remote resource for storing media content. For instance, based on an analysis of user management patterns and preferences, user device 210 determine that the user often prefers to have several pictures stored on his or her user device 210 at any given time. Based on this, and other information, user device 210 may reasonably conclude that the user may place a higher priority on storing the recently analyzed picture of the soccer game over one or more other types of pictures that user device 210 may be storing concurrently. As such, if and when the time comes to delete or transfer some of the pictures stored by user device 210 to an external device, user device 210 may recommend to the user that the non-soccer pictures be offloaded or deleted instead of the soccer picture.

User device 210 may also analyze other aspects of the content in order to help ascertain value. For instance, user device 210 may determine the time and geographic location associated with the content (e.g., in the case of image content, a geo-tag that indicates where the image was captured). Based on user information stored by user device 210 and regular traveling patterns of the user (e.g., to and from work), user device 210 may be aware of the where the user lives and works, in addition to the general geographic region where the user spends most of his or her time. As such, user device 210 may use information such as the date, time, and location associated with a picture to determine the likelihood that the picture has some special significance (i.e., value) to the user. In other words, because user device 210 knows the typical routine of the user, user device 210 may determine whether a particular picture was taken at a time and location that is outside of his or her routine, such as during a vacation, a weekend getaway, or other special event.

In some implementations, user device 210 may further confirm whether the picture has any significance due to the time and place it was taken by accessing calendar information that is stored, or otherwise accessible, by user device 210. For instance, user device 210 may verify whether the picture was taken during a vacation by determining whether the time and location associated with the picture coincides with a calendar entry of the user that describes a vacation. User device 210 may also consider whether the geographic location associated with the picture is outside the normal travel routine of the user and near to the home addresses of friends or relatives (which may also be accessible via an address book stored by user device 210), near popular tourist destination or tourist attractions, etc.

User device 210 may use the time and/or location associated with media content in other ways as well. For instance, user device 210 may determine whether the time of a picture coincides with a birthday of a friend or loved one (information that may be available to user device via social media accounts, an electronic address book stored by user device 210, a calendar entry, etc. In some implementations, user device 210 may help confirm that the picture corresponds to the birthday party of a friend or loved one by determining whether the location of associated with the picture is within a reasonable distance from the home of the person celebrating his or her birthday, and may use facial recognition technology (e.g., in the manner described above) to identify whether any individuals within the picture include the person celebrating his or her birthday or friends and relatives of the person celebrating his or her birthday.

An example of time and/or location associated with an audio signal may include a song that is recorded on a birthday of a friend or family member of the user (as noted in an address book, calendar, social network profile, etc.) and in a home or the user or the friend or family member of the user. Due to the time and location of the song, user device 210 may determine that the song is likely a happy birthday song for the friend or family member, and is therefore probably important to the user for storage purposes.

Additionally, user device 210 may determine one or more content categories that may apply to media content. A content category may include themes or characteristics under which media content may be logically grouped. Examples of content categories may include Home, Work, Vacation, Friends, Family, Landscapes, Food, Pets, Athletics, etc. A content category for an audio signal may include a type of music, a public speech, a comedic presentation, etc. In some implementations, other types of categories may be useful in determining the value of content.

To continue with one of the examples discussed above, upon determining that the picture in question was probably taken on a vacation that was spent with friends and family, user device 210 may determine that the picture may be associated with content categories such as Vacations, Travel, Friends, and/or Family. Identifying a content category to which the picture pertains may further enable user device 210 to determine the value of the picture since the user may have different storage preferences or management patterns for media content of different content categories. For instance, the management patterns of the user may be such that the user typically keeps pictures of friends, family, and vacations on his or her user device 210, whereas media content associated with the Work category is often moved from user device 210 to media storage server 220.

User device 210 may also identify user management patterns and preferences with respect to the manner in which the user manages his or her media content. For example, the user may often communicate with his or her friends and family using text messages that often include pictures and videos. In this example, assume that user device 210 discovers that pictures and videos that are taken at or around the time that the user is texting his or her friends and family are often discarded by the user shortly after they are sent via text message. By contrast, user device 210 may also discover that pictures and videos that were taken well before the user beings texting his or her friends and family are discarded by the user at a much lower rate than an average discard rate for the user. In such a scenario, user device 210 may discover a behavioral pattern of the user that can be used to help determine the value of media content stored by user device 210. For instance, user device 210 may determine that media content that is captured and sent to friends and family during a text message conversation with the friends and family are likely to be below-average in value; however, media content that is sent to the friends and family, but created well before the text message conversation with the friend and family are more likely to be above-average in value.

User device 210 may discover user management patterns and preferences with respect to other types of user conduct. For instance, user device 210 may discover that once the user uploads media content to a social network service, the user typically causes the media content to be deleted from the local storage of user device 210. However, in time, user device 210 may later discover that there is an exception to this user management pattern when the media content involved belongs to a particular content category, such as a Family or Children category. As such, user device 210 may monitor user behavioral patterns in order to discover trends and preferences on the part of the user. In so doing, user device 210 may pro-actively enhance the ability of user device 210 to manage local storage capacity in a manner that adapts to the behaviors and preferences of the user.

User device 210 may also consider the size of media content relative to the available storage capacity of user device 210. For example, assume that the local storage capacity of user device 210 has almost exceeded a pre-selected storage capacity threshold (that may be near the absolute maximum storage capacity of user device 210), and the user of user device 210 decides to record a lengthy video or audio recording at the birthday party of his or her child. Also assume that the user management patterns and preferences are such that the user has a relatively strong preference for storing recent media content involving family on user device 210; however, due to the length of the video, there is not enough room to store the video or audio recording locally.

In response, user device 210 may browse other media content that is being stored locally to determine whether there are other types of media content that the user would be more likely to delete and/or upload to, for example, media storage server 220. Upon completing an analysis of the stored media content, user device 210 may inform the user of the lack of local storage capacity and provide a list of the less-preferred media content that user device 210 intends to upload to media storage server 220 in order make room to locally store the video or audio recording of the birthday party. Upon receiving the consent of the user, user device 210 may proceed by moving the identified media content to media storage server 220 and then locally storing the video or audio recording of the birthday party. In some implementations, user device 210 may carry out the same or similar operations without informing the user, in order to provide a storage management service that is more fully automated.

User device 210 may implement a content valuation algorithm in order to determine the value of media content. The value of media content may include a numeric value representing a predicted preference on the part of the user for storing the media content locally versus offloading the media content to an exterior device and/or deleting the media content. The content valuation algorithm may include various logical rules, conditions, triggers, and/or exceptions in order to evaluate the available information in a manner that is consistent with the preferences and expectations of the user. The content valuation algorithm may also, or alternatively, include tools for customizing the weight or amount of consideration given to a particular type of input relative to another type of input.

In some implementations, doing so may better enable the content valuation algorithm to adapt to users that have a greater preference for one type of media content relative to another type of media content. For instance, if the user has a strong preference for storing vacation pictures on user device 210, then content algorithm may accommodate the user's preference by giving greater weight to pictures that fall under the content category of Vacations. As a result, the value assigned to such pictures may be greater than it otherwise would be, thereby increasing the chance that user device 210 will store the pictures locally.

Additionally, as the storage management capabilities may be adaptable to changes in the behavioral patterns and preferences of the user, user device 210 may be capable of implementing a feedback system whereby user device 210 can make adjustments to the content valuation algorithm and/or the manner in which the content valuation algorithm is applied. For instance, if at first the user has a strong preference for storing pictures of his or her kids on user device 210, user device 210 may make one or modifications to content valuation algorithm in order to reflect the strong preference of the user and operate in manner that is consistent with her or her preferences and expectations.

Additionally, if the user later changes his or her preference to offloading media content involving family to media storage server device 220 or another device (such as a personal computer), user device 210 may update the content valuation algorithm to reflect the change in user preference. For instance, if the user consistently moves all pictures involving family from user device 210 to media storage server 220, user device 210 may begin doing so automatically or may provide the user with a prompt asking for permission to begin doing so automatically. In some implementations, the user may have the option of having the pictures uploaded automatically, but only after a prompt for doing so is provided to the user and the user grants permission to do so.

In some implementations, certain types of information may have different weights in determining the value of media content. For instance, content quality may be granted greater significance when determining the value of media content than the content features or the time and location of the content media. As a specific example, a user may be a professional photographer and may thus have a great preference for high quality media content. As such, the user may have a tendency to delete videos or photographs that are blurry, have poor lighting, or are otherwise low quality. In response, user device 210 may respond to the user's preferences by granting content quality greater weight than other types of information when determining the value of the media content. A similar example may be applicable to a musician that has a strong preference for audio recordings that high quality (as opposed to, for example, the time and location when an audio recording was made).

Figure 5:
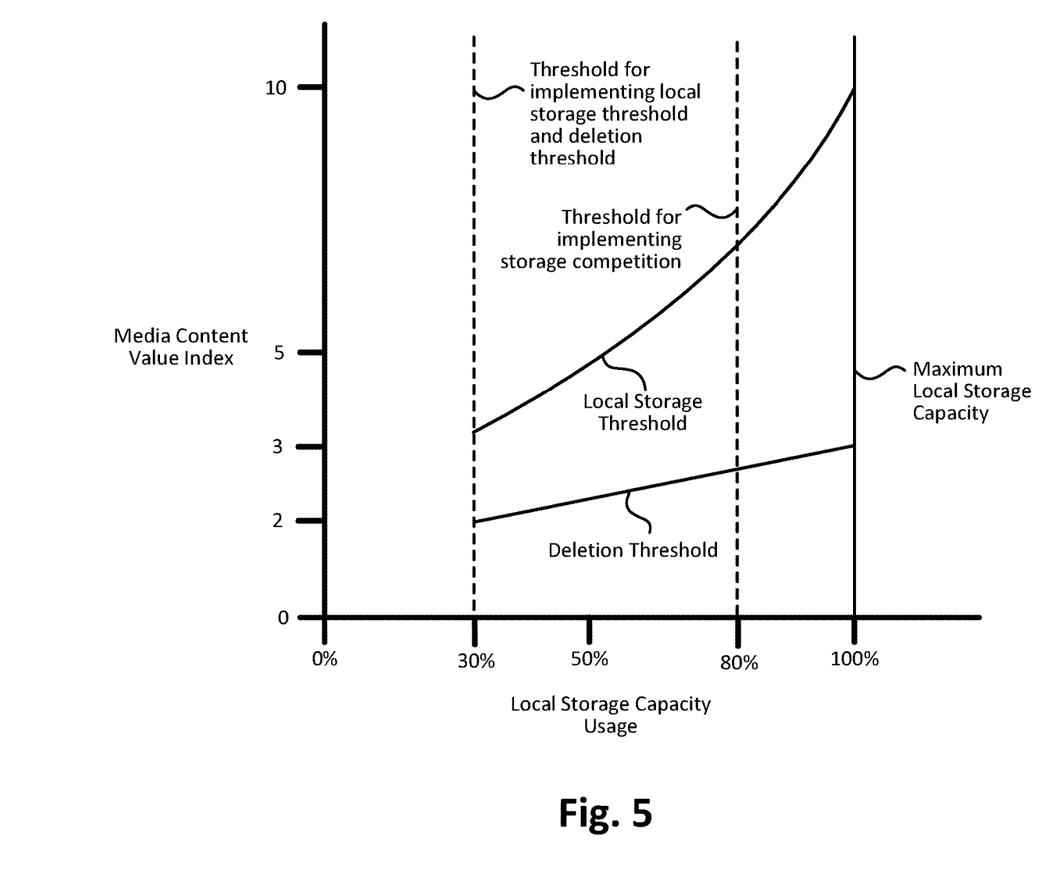
FIG. 5 is a diagram of a table representing example rules, thresholds, and conditions for determining whether to delete media content.

FIG. 5 is a diagram of a table representing example rules, thresholds, and conditions for determining whether to delete media content. As shown, the table may include a horizontal axis representing storage capacity usage that ranges from 0% to 100% and a vertical axis representing an index of media content values that range from 0 to 10. The rules, thresholds, and conditions represented in FIG. 5 may be implemented by user device 210.

Generally speaking, user device 210 may implement a relatively liberal storage policy, so long as there is ample storage capacity. For instance, as illustrated in FIG. 5, user device 210 may locally store media content, regardless of the value of the media content, so long as local storage capacity usage remains at or below 30%. After local storage capacity usage exceeds 30%, user device 210 may implement a deletion threshold, whereby media content must be assigned a particular value (e.g., at least 2, when the local storage capacity is at 30%), in order to avoid being deleted by user device 210 (which may be done automatically or after a prompt for permission to delete is provided to the user and permission from the user is received). In addition, once local storage capacity usage exceeds 30%, user device 210 may implement a local storage threshold whereby media content must be assigned a particular value (e.g., at least 3, when the local storage capacity is at 30%), in order to be stored locally by user device 210. Media content with a value between the deletion threshold and the local storage threshold may be moved from user device 210 to an external storage device, such as media storage system 230.

As depicted, the local storage threshold and the local storage usage may continue to increase such that new media content must have a progressively higher value in order to be stored locally by user device 210. In this example, the deletion threshold increases linearly as local storage capacity increases above 30%. In some implementations, however, the deletion threshold may remain the same (e.g., independent of local storage capacity usage) and/or may vary in a manner that is nonlinear (e.g., exponentially increasing). Additionally, in this example, the threshold for implementing storage competition increases nonlinearly as local storage capacity increases above 30%. In some implementations, however, the threshold for implementing storage competition may remain the same (e.g., independent of local storage capacity usage) and/or may vary in a manner that is linear.

In some implementations, while not explicitly shown in FIG. 5, the local storage threshold and/or the deletion threshold may also, or alternatively, be affected by other factors, such as the average value of media content that is stored locally. For example, if the average value of the locally stored content is above a certain value, the local storage threshold, for new content, may increase. Additionally, or alternatively, some of the media content that was stored locally while the local storage capacity usage was below 30% may have a value that is much lower than media content that is stored locally after the local storage capacity usage is above 50%. As such, if and when once local storage capacity usage exceeds 80%, user device 210 may implement a storage competition policy.

Under the storage competition policy, new media content may be stored locally by user device 210 so long as the new media content exceeds the local storage threshold. In addition, user device 210 may identify the locally stored media content with the lowest value and may offload the identified media content if the value of the identified media content does not exceed the current local storage threshold. In scenarios where the new media content is much larger in size than the media content with the lowest value, user device 210 may perform the same check on the locally stored media content with the second lowest value, third lowest value, and so on, until the amount of media content that is offloaded to media storage server 220 is approximately the same as the high-value media content that is now being stored by user device 210. Implementing a storage competition policy may enable high-value media content to be stored by user device 210 without increasing the local storage threshold or the local storage capacity usage until the media content with the lowest value in the local memory exceeds the current local storage threshold. Over time, the value of the media content stored by user device 210 may continue to increase until the maximum local storage capacity is reached. Accordingly, user device 210 may implement a variety of rules, policies, thresholds, and triggers in order to dynamically manage media content and local storage capacity.

Figure 6:
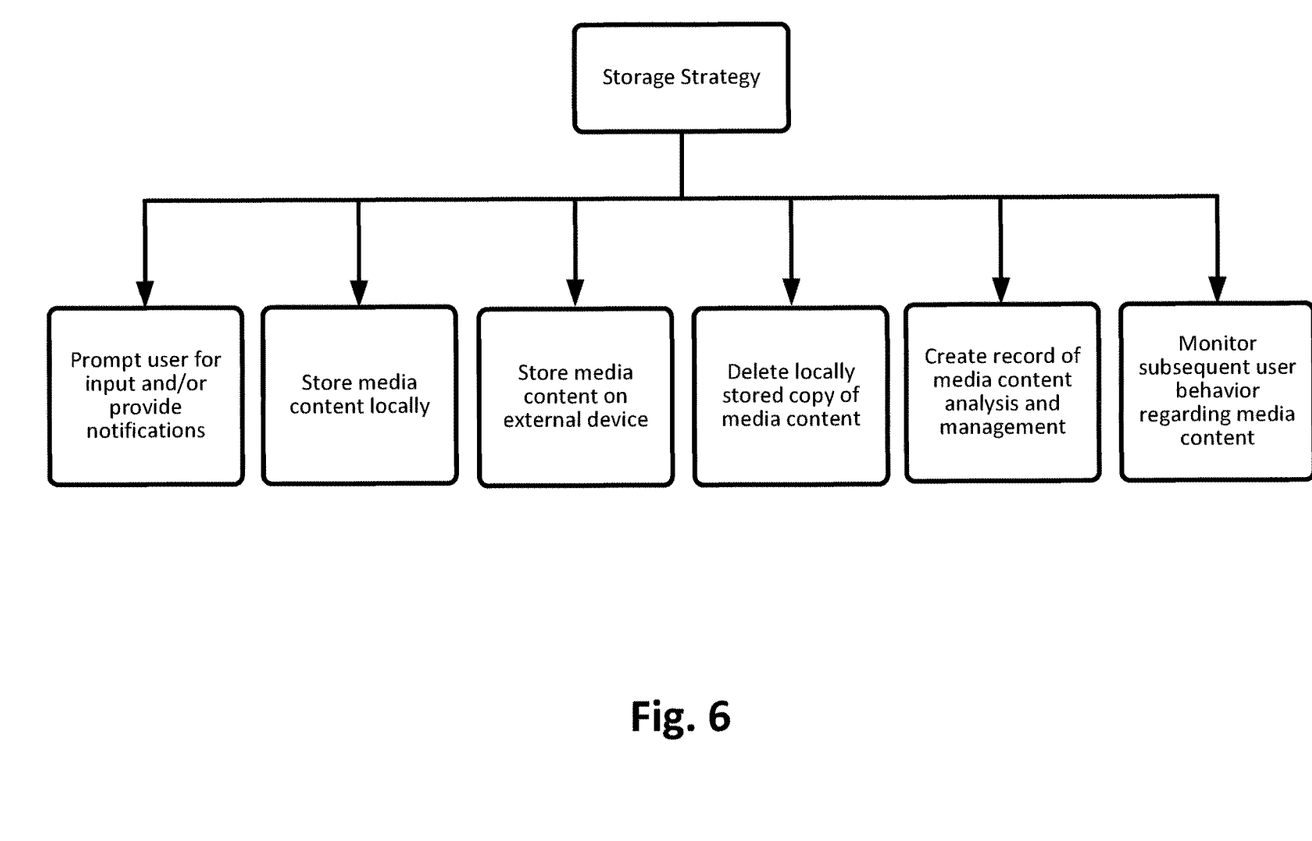
FIG. 6 is a logical flow diagram of an example implementation for executing a storage strategy regarding media content.

FIG. 6 is a logical flow diagram of an example implementation for executing a storage strategy regarding media content. As shown, a storage strategy for storing media content may include a variety of operations, such as prompting the user for input and/or permissions, storing media locally on user device 210, storing media content on an external device, deleting a local copy of the media content, creating a record of the media content and the manner in which the media content has been handled, and monitoring subsequent user behaviors regarding the media content. The operations represented by the logical flow diagram of FIG. 6 may be implemented by user device 210. In some implementations, the storage strategy may include executing all of the operations shown in FIG. 6. In some implementations, executing a storage strategy may include fewer operations, additional operations, or different operations than those depicted in FIG. 6.

User device 210 may prompt the user for input (e.g., instructions, preferences, permissions, etc.) that may be required to carry out the storage strategy and/or provide the user with notations that, for example, storage strategy operations have begun or are completed. For example, user device 210 may create generate an audio signal that is accompanied with a visual notification that prompts the user to indicate whether media content should be deleted or stored on a particular device (e.g., locally on user device 210, on media storage server 220, etc.). In another example, user device 210 may notify the user that certain media content will be transferred to an external device and the user may provide instructions regarding which external device (e.g., media storage server 220, a personal computer of the user, etc.) should receive the media content and the location on the external device where the media content should be stored. As another example, user device 210 may prompt the user to indicate whether the user would like user device 210 to execute subsequent storage strategies (or certain portions of a storage strategy) automatically (e.g., without prompting the user for input and/or providing the user with notifications as storage strategy operations performed).

User device 210 may store media content locally, such as in a local memory or storage device of user device 210. In some implementations, the media content may be stored by user device 210 while user device is determining the value of the media content, determining whether or not to delete the media content, etc. In such implementations, user device 210 may store the media content locally simply by not moving or modifying the stored media content.

User device 210 may store media content on an external device. Additionally, or alternatively, user device 210 may delete a locally stored copy of the media content. For example, user device 210 may provide a copy of the media content to media storage server 220 and, after the copy of the media content has been received by media storage server 220, proceed to delete the local copy of the media content. In some implementations, the storage strategy or the media content may include maintaining copies of the media content on both user device 210 and media storage server 220.

In some implementations, media content may be stored in a particular location (e.g., a particular file) on the external device based on one or more characteristics of the media content. Examples of such characteristics may include quality, features, theme, location, etc. In addition, if a user creates media content using several difference devices, such as a smart phone, a wearable device, and a tablet computer, the device (and/or the type of device) used to create the media content may be used to determine where to store the media content on the external device. For instance, the external device may have a folder for pictures created using the smart phone, another for pictures created using the wearable device, and so on. In some implementations, the type of device used to create the content may be combined with another characteristic of the media content in order to determine where to store the media content on the external device. For instance, the external device may include a folder for media content created using a smart phone, and that folder may include subfolders for outdoor pictures created using the smart phone and indoor pictures created using the smart phone. As such, one or more characteristics of the media content may help determine where the media content is stored on an external device.

User device 210 may create a record of the media content analysis and management of the media content. For instance, user device 210 may store metadata describing the media content, such as information about the content quality, the type of media content (e.g., picture, video, audio recording, etc.), the actual content itself, the time and geographic location associated with the media content, etc. Additionally, or alternatively, user device 210 may maintain a record of the manner in which the media content was managed (e.g., whether it was stored locally by user device 210, deleted, sent to media storage server 220, etc.). In some implementations, maintaining a record of media content and the way that the media content is managed may enable user device 210 to develop a historical record of the user's preferences and management behaviors, which may be used to make future decisions regarding the how the user would like similar types of media content to be managed and stored.

User device 210 may monitor subsequent user behavior regarding the media content. For instance, if media content is stored on user device 210 or media storage server 220, user device 210 may monitor if and when the user accesses the media content, if and when the user decides to delete the media content, how the user organizes files and folders associated the media content, etc. In some implementations, monitoring the user's behavior may provide user device 210 with additional information regarding the types of media content the user considers important, how the user categorizes media content (e.g., what content categories the user associates with the media content (which may be represented by the naming and archiving system the user implements for storing the media content)), whether the user's preferences have changed regarding certain types of content, etc. Similar to the potential benefit of creating a record of media content, monitoring the subsequent behavior of the user with respect to media content may provide additional insight into the types of storage services and recommendations that would be most accommodating to the user's current preferences and interests.

Figure 7:
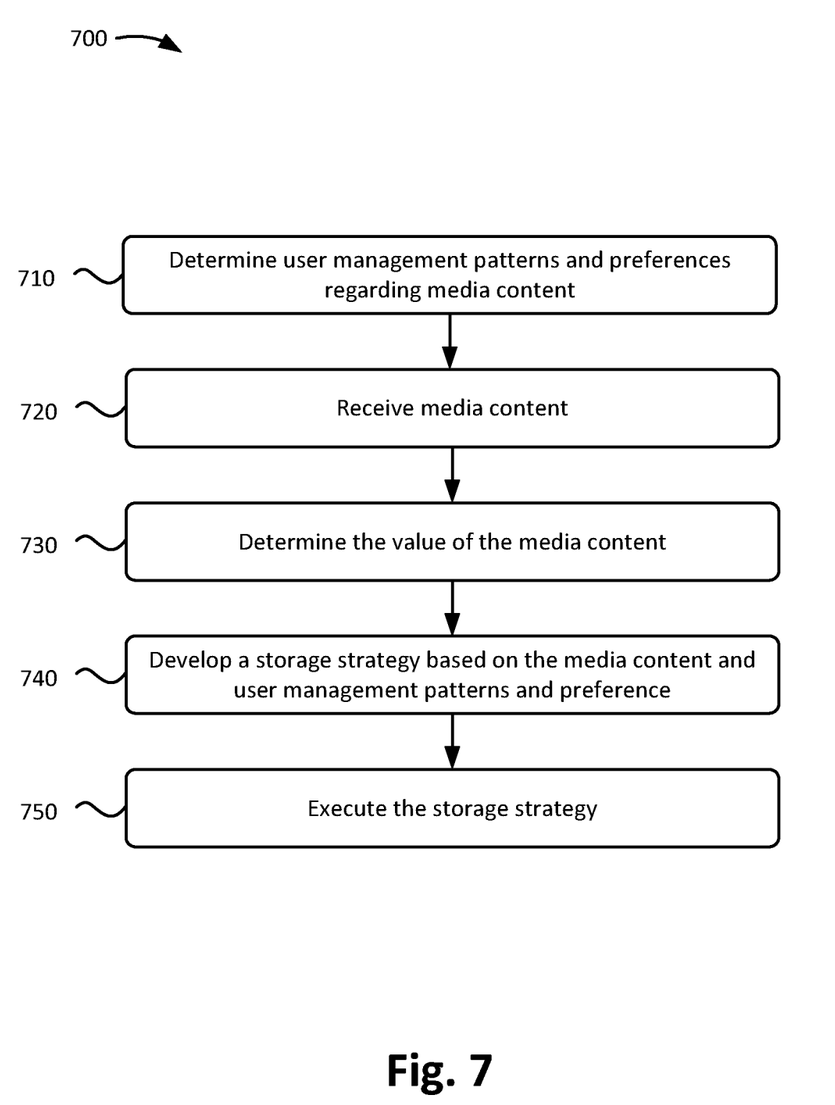
FIG. 7 is a flowchart diagram of an example process for determining the value of media content.

FIG. 7 is a flowchart diagram of an example process 700 for determining the value of media content. Process 700 may be implemented by user device 210 (e.g., by media content management application).

As shown, process 700 may include determining user management patterns and preferences regarding media content (block 710). For example, user device 210 may monitor the inputs from the user regarding media content in order identify behavioral patterns and preferences of the user. For example, the user may have a tendency to periodically upload pictures and videos to a social network service and then delete the local copies of the pictures and videos once the content is uploaded.

In response to this repeated behavior, user device 210 may determine that the value of media content decreases once the media content has been uploaded to a social network service. In another example, the user may have a tendency to take multiple pictures in quick succession and later browse the near-identical pictures in order to identify which picture the user likes the most and delete the other pictures. After monitoring this behavior several times, user device 210 may determine that the value of a particular photograph may be affected by the uniqueness of the photograph such that the value of a particular photograph (e.g., the probability that the user decide to keep the photograph) decreases when there are other photographs that are the same or very similar as the photograph in question.

In some implementations, user device 210 may determine the uniqueness of media content based on, for example, an analysis and comparison of the media content with other types of media content, a time stamp associated with the media content, a location associated with the media content, etc. For instance, user device 210 may compare a picture to other pictures stored by user device 210 and determine that all of the pictures where taken in quick succession of one another and include very similar content features. In such a scenario, user device 210 may determine that the pictures are not very unique and adjust the value of each picture accordingly.

Additionally, when the user takes multiple pictures that are nearly identical to one another, user device 210 may analyze the quality and content of each picture and compare the quality and content of the discarded pictures to the quality and content of the saved picture in order to identify the types of quality (e.g., good lighting, lack of blurring, good picture orientation, red eye, etc.) that are most valuable to the user. With time, and consistency on the part of the user, user device 210 may develop enough insight into the preferences of the user so as to assist in the process of analyzing a set of nearly identical pictures and identifying the picture that the user will ultimately decide to keep. In some implementations, user device 210 may assist the user in such a process by performing a preliminary analysis of the pictures and provide a recommendation to the user about which picture(s) the user is most likely to keep and/or the pictures that the user is most likely to delete.

Process 700 may include receiving media content (block 720). For example, user device 210 may receive media content by a user operating user device 210 to take pictures, videos, and/or audio recordings. Additionally, or alternatively, user device 210 may receive media content in another way, such as by downloading media content from a webpage, by receiving media content in an email or text message, by syncing user device 210 with another device (e.g., a personal computer), etc.

Process 700 may include determining the value of the media content (block 730). For example, user device 210 may determine the value of the media content based on one or more factors that are relevant to determining whether the user will likely want to save or discard the media content. Descriptions and examples of determining the value of media content have been provided above with reference to, for example, FIGS. 3 and 4. As such, additional descriptions and examples regarding determining the value of media content are not warranted.

Process 700 may include developing a storage strategy based on the media content and the user management patterns and preferences (block 740). For instance, user device 210 may identify media content that was received in the past but is nevertheless analogous to the newly received media content in terms of, for example, quality, features, time and location, etc. In some implementations, a significant factor in identifying analogous media content may include a value of previously received media content being the same, or similar, to the value assigned newly received media content. In some implementations, user device 210 may develop the storage strategy that is based on if and/or where the user stored the analogous media content.

Process 700 may include executing the storage strategy to the user (block 750). For instance, user device 210 may notify the user of the storage strategy developed by user device 210. The notification may include a way for the user to accept the storage strategy, decline the storage strategy, and or modify the storage strategy. In response to receiving permission to implement the storage strategy, user device 210 may proceed to execute the storage strategy in a manner that is consistent with the storage strategy approved by the user, which may the same as the storage strategy proposed to the user, a modified version of the storage strategy proposed by the user, or a storage strategy that is completely different from the storage strategy proposed to the user. As such, user device 210 may manage the media content and the storage capacity used to store the media content based on a comparison of the newly received media content and user management patters and preferences corresponding to analogous media content.

Figure 8:
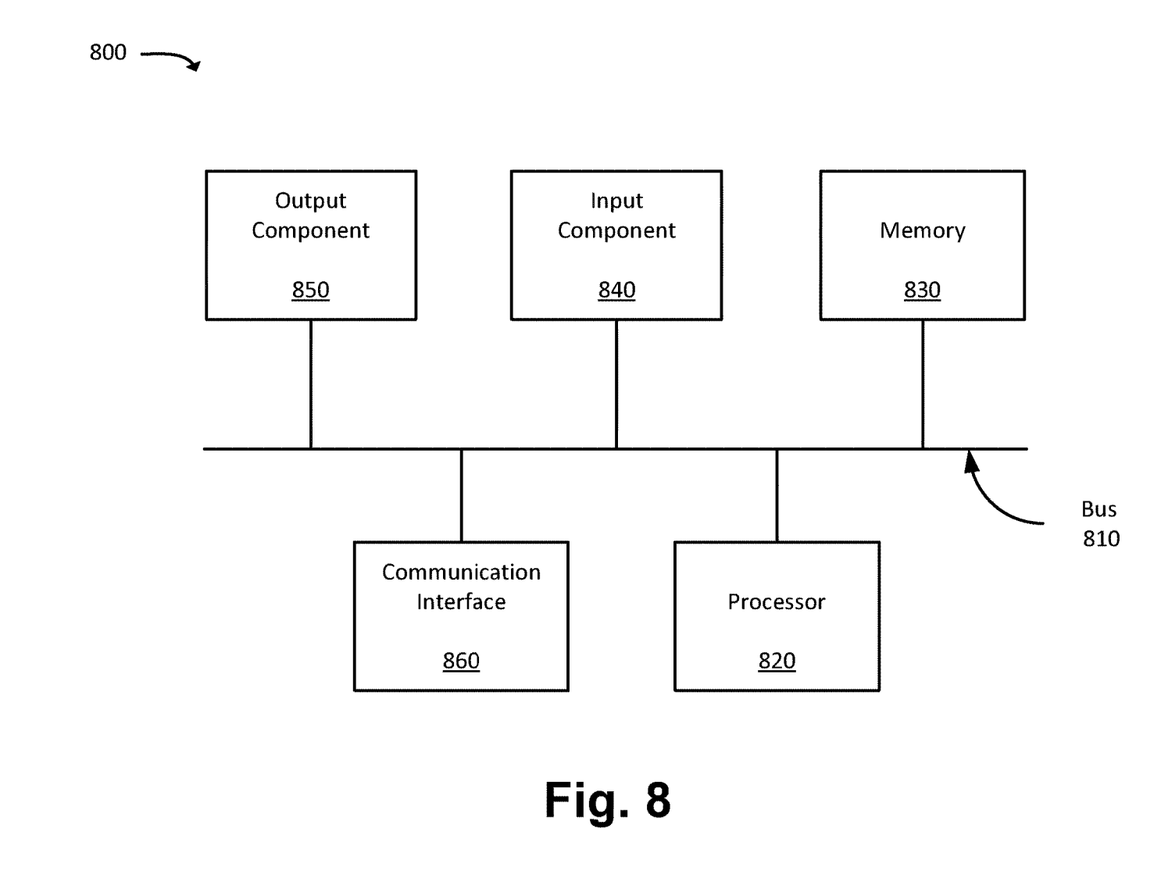
FIG. 8 is a diagram of example components of a device.

FIG. 8 is a diagram of example components of a device 800. Each of the devices illustrated in FIGS. 1-2 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIGS. 3, 4, 6, and 7, the order of the blocks may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a user device, comprising:
   receiving, by the user device, media content;
   determining, by the user device, one or more attributes associated with the received media content;
   determining, by the user device and based on the one or more attributes, a value of the media content;
   determining, by the user device, an amount of available local storage associated with the user device;
   determining, by the user device and based on the amount of available local storage associated with the user device, a deletion threshold, wherein differing amounts of available local storage are associated with differing values for the deletion threshold;
determining, by the user device and based on whether the value of the media content exceeds the deletion threshold, a storage strategy for storing the media content, the storage strategy including at least one of:
storing the media content locally on the user device,
storing the media content remotely on an external device, or
deleting the media content; and
executing, by the user device, the storage strategy for the media content.

2. The method of claim 1, wherein the media content includes at least one of:
an image,
a video, or
an audio recording.

3. The method of claim 1, wherein the one or more attributes include:
a presence of blurriness in the media content,
graphical features within the media content,
a time and location associated with the media content, or
a content category associated with the media content.

4. The method of claim 1, further comprising:
prior to executing the storage strategy, requesting permission to execute the storage strategy.

5. The method of claim 4, further comprising:
in response to receiving permission to execute the storage strategy, creating a record of the media content and the storage strategy to develop behavioral patterns, wherein the behavioral patterns are used in determining a storage strategy for subsequently received content media.

6. The method of claim 1, wherein executing the storage strategy includes:
determining whether the media content is stored remotely, in addition to at a local storage of the user device; and
deleting the media content from the local storage when determining that the media content is stored remotely.

7. A user device comprising:
a non-transitory memory device storing a plurality of processor-executable instructions; and
a processor configured to execute the processor-executable instructions, wherein executing the processor-executable instructions causes the processor to:
receive media content;
determine one or more attributes associated with the received media content;
determine, based on the one or more attributes, a value of the media content;
determine an amount of available local storage associated with the non-transitory memory device of the user device;
determine, based on the amount of available local storage, a deletion threshold, wherein differing amounts of available local storage are associated with differing values for the deletion threshold;
determine, based on whether the value of the media content exceeds the deletion threshold, a storage strategy for storing the media content, the storage strategy including at least one of:
storing the media content locally on the user device,
storing the media content remotely on an external device, or
deleting the media content; and
execute the storage strategy for the media content.

8. The user device of claim 7, wherein the media content includes at least one of:
an image,
a video, or
an audio recording.

9. The user device of claim 7, wherein the one or more attributes include:
a presence of blurriness in the media content,
graphical features within the media content,
a time and location associated with the media content, or
a content category associated with the media content.

10. The user device of claim 7, wherein the processor-executable instructions further cause the processor to:
prior to executing the storage strategy, request permission to execute the storage strategy.

11. The user device of claim 10, wherein the processor-executable instructions cause the processor to:
in response to receiving permission to execute the storage strategy, create a record of the media content and the storage strategy to develop behavioral patterns, wherein the behavioral patterns are used in determining a storage strategy for subsequently received content media.

12. The user device of claim 7, wherein the processor-executable instructions, to execute the storage strategy, further cause the processor to:
determine whether the media content is stored remotely, in addition to at a local storage of the user device; and
delete the media content from the local storage when determining that the media content is stored remotely.

13. The user device of claim 7,
wherein a first amount of available local storage is associated with a first value for the deletion threshold,
wherein a second amount of available local storage is associated with a second value for the deletion threshold,
wherein the first amount of local storage is higher than the second amount of local storage, and
wherein the first value for the deletion threshold is higher than the second value for the deletion threshold.

14. The method of claim 1,
wherein a first amount of available local storage is associated with a first value for the deletion threshold,
wherein a second amount of available local storage is associated with a second value for the deletion threshold,
wherein the first amount of local storage is higher than the second amount of local storage, and
wherein the first value for the deletion threshold is higher than the second value for the deletion threshold.

15. A non-transitory computer-readable medium storing a plurality of processor-executable instructions, wherein execution of the processor-executable instructions, by one or more processors of a user device, cause the one or more processors to:
receive media content;
determine one or more attributes associated with the received media content;
determine, based on the one or more attributes, a value of the media content;
determine an amount of available local storage associated with the user device;
determine, based on the amount of available local storage, a deletion threshold, wherein differing amounts of available local storage are associated with differing values for the deletion threshold;

determine, based on whether the value of the media content exceeds the deletion threshold, a storage strategy for storing the media content, the storage strategy including at least one of:
storing the media content locally on the user device,
storing the media content remotely on an external device, or
deleting the media content; and
execute the storage strategy for the media content.

16. The non-transitory computer-readable medium of claim 15, wherein the media content includes at least one of:
an image,
a video, or
an audio recording.

17. The non-transitory computer-readable medium of claim 15, wherein the one or more attributes include:
a presence of blurriness in the media content,
graphical features within the media content,
a time and location associated with the media content, or
a content category associated with the media content.

18. The non-transitory computer-readable medium of claim 15, wherein the processor-executable instructions further cause the one or more processors to:
prior to executing the storage strategy, request permission to execute the storage strategy.

19. The non-transitory computer-readable medium of claim 18, wherein the processor-executable instructions cause the one or more processors to:
in response to receiving permission to execute the storage strategy, create a record of the media content and the storage strategy to develop behavioral patterns, wherein the behavioral patterns are used in determining a storage strategy for subsequently received content media.

20. The non-transitory computer-readable medium of claim 15, wherein the processor-executable instructions, to execute the storage strategy, further cause the one or more processors to:
determine whether the media content is stored remotely, in addition to at a local storage of the user device; and
delete the media content from the local storage when determining that the media content is stored remotely.

* * * * *